June 23, 1964 D. E. ALLEN ETAL 3,138,276
DEMOUNTABLE TRUCK BODY
Filed Feb. 9, 1962 2 Sheets-Sheet 1
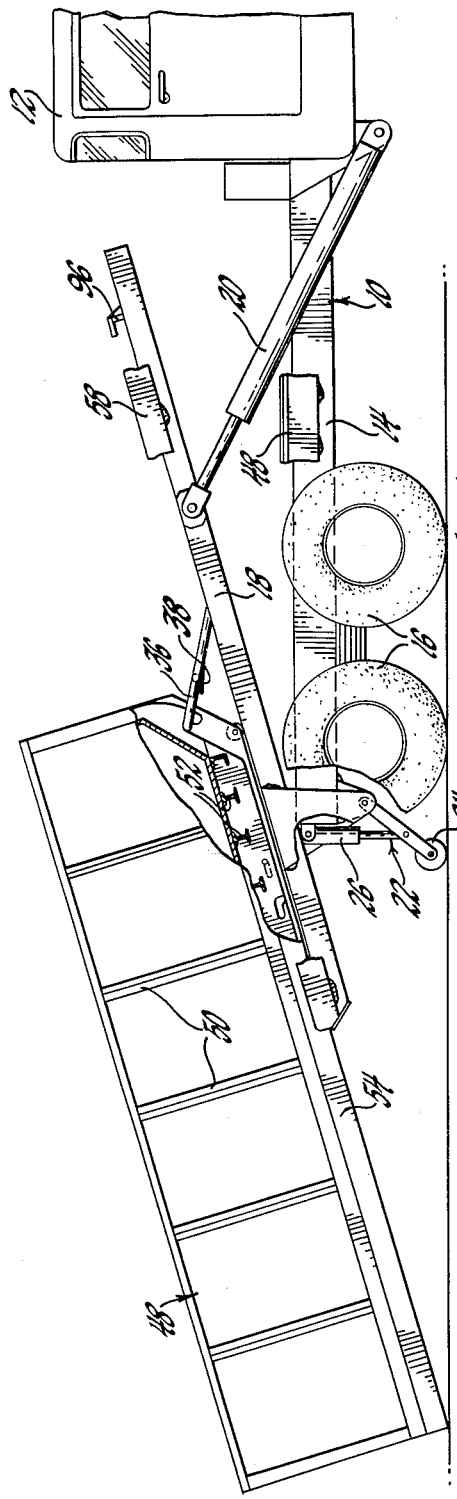
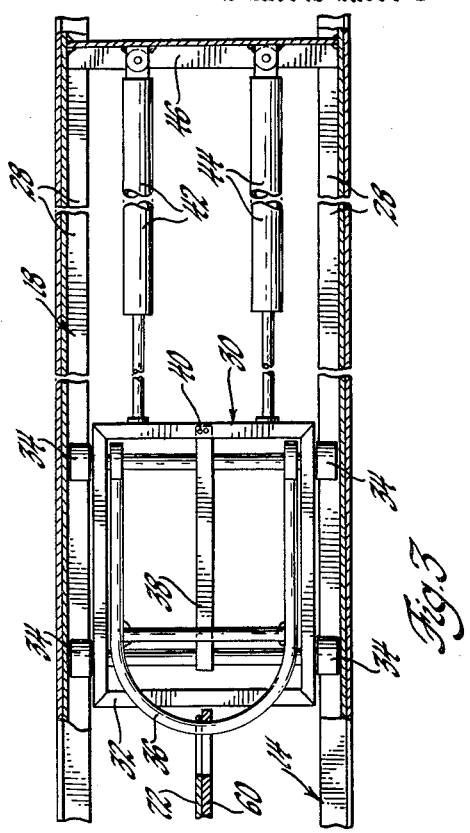
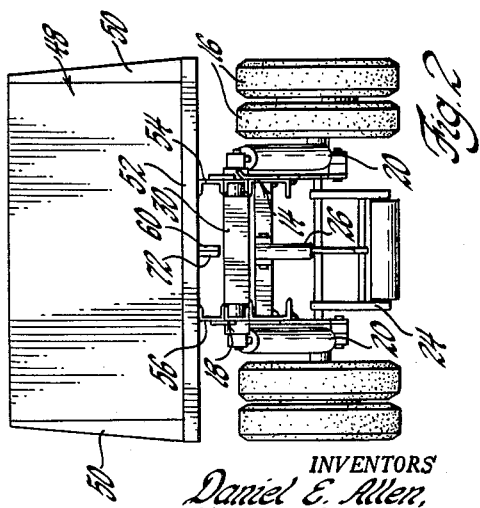
INVENTORS
Daniel E. Allen,
BY Harold E. Allen &
Stuart E. Allen
Dale A. Winnie
ATTORNEY

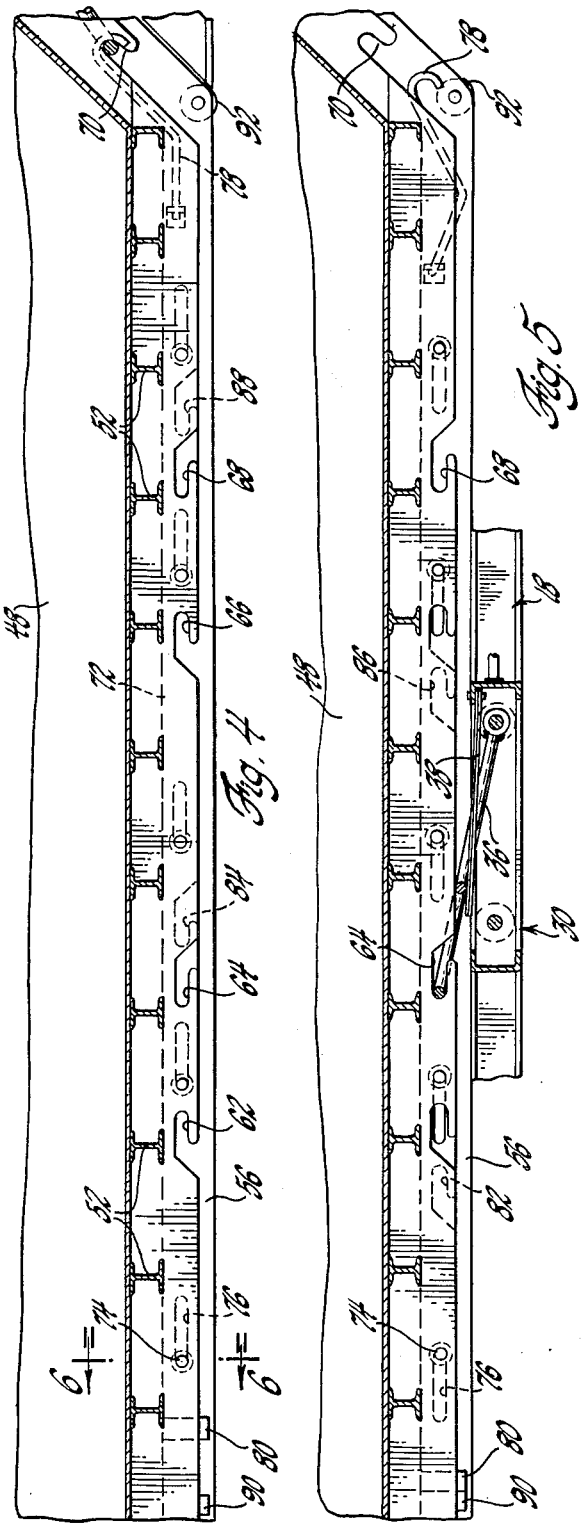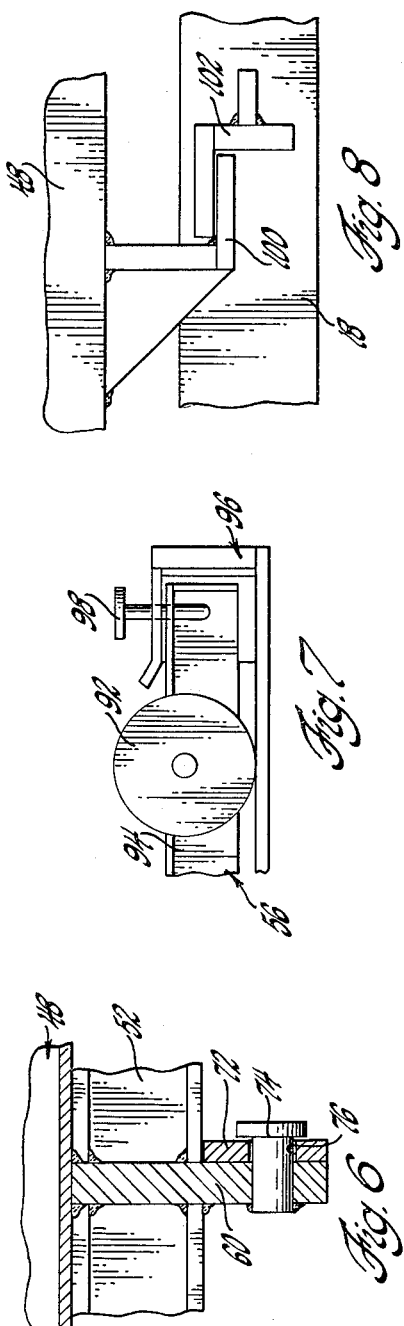

United States Patent Office 3,138,276
Patented June 23, 1964

1

3,138,276
DEMOUNTABLE TRUCK BODY
Daniel E. Allen, Pontiac, Harold E. Allen, Oak Park, and Stuart E. Allen, Huntington Woods, Mich. (all of Box 2, Pontiac, Mich.)
Filed Feb. 9, 1962, Ser. No. 172,202
6 Claims. (Cl. 214—505)

This invention relates to demountable truck bodies in general and more particularly to the operating mechanism permitting expedient handling in loading or removing a demountable truck body or container member from a truck chassis.

Considerable emphasis is presently being given the advantages of containerized shipments; that is, the use of a single freight carrying container which may be transferred from a loading dock to a flat bed highway carrier, railroad car, ship deck or elsewhere without repeated loading and unloading of the cargo. These advantages include not only the labor cost and time saved in not having to rehandle the freight involved, but also a considerable savings to the carrier since their equipment is not tied up during loading and unloading operations.

Quite obviously, the practicality of the use of containerized shipments depends upon the freight shipment involved, the expense of providing the necessary equipment for loading and unloading the container member, and the serviceability of the operating mechanism which is used. In this latter regard, any shipment which is dropped may be damaged and lost; not to mention the damage to the container member and subsequent further maladjustment which might be caused to the operating mechanism of other carriers to which the damaged container might be transferred.

It is an object of this invention to disclose a new and novel demountable truck body with related operating mechanism which enables expedient and dependable loading and unloading of the demountable truck body without chance of damage thereto.

The demountable truck body herein disclosed should be viewed as a freight carrying container since this is its function and closed containers for such purpose may be adapted to include like features without departure from the teaching of this invention.

The particular demountable truck body which will be described to illustrate this invention is a simple open container such as may be used to collect scrap metal at manufacturing facilities. Although the scrap shipment involved does not itself require careful handling, it will be appreciated that the same problems as regards handling of the demountable container and the problems of avoiding damage to the container and its operating mechanism still pertain.

Heretofore, the use of a dump truck operating mechanism with a demountable truck body has been suggested. In such use the tiltable frame of the dump truck is raised to cause the container to slide off the frame and a cable reel and hook arrangement is used to pull the container back on the truck. This arrangement requires considerable manipulation of the truck and the hook mechanism and is not very satisfactory.

It is an object of this invention to make use of a tilting frame and demountable container arrangement, such as that mentioned, but to provide an improved operating mechanism which requires essentially no manual attention.

It is an object of this invention to provide a demountable container having a plurality of loading and unloading hooks provided on its underside and cooperatively disposed for engagement with a power operated catch.

A further object, in this latter regard, is to provide means for having only the loading or unloading hooks

2 accessible during the loading and unloading operation without special attention in this respect.

As will subsequently be described, this invention contemplates the use of a shuttle bar and hook arrangement provided on the underside of a demountable truck body or container member with operative means at opposite ends of the shuttle bar for automatic actuation thereof in the course of loading or unloading and, further, the exposure of only one set of operating hooks and the attendant closing of the other set thereof.

These and other objects and advantages to be gained in the practice of this invention will be more clearly understood and better appreciated after a reading of the following specification directed to a preferred embodiment of this invention and with reference to the accompanying drawings wherein:

FIGURE 1 is a fragmentary side plan view of a truck and demountable body structure incorporating the features of this invention.

FIGURE 2 is an end view of the truck and demountable body structure.

FIGURE 3 is an enlarged fragmentary top plan view of the tilting frame portion of the truck shown by FIGURES 1 and 2.

FIGURE 4 is an enlarged fragmentary longitudinal cross sectional view of the underframe of the demountable body or container member emphasizing certain details thereof.

FIGURE 5 is similar to FIGURE 4 with certain parts of the operating mechanism provided on the container underframe shown in a different relative position.

FIGURE 6 is a fragmentary and further enlarged cross sectional view of a part of the demountable body or container underframe as seen in the plane of line 6—6 in FIGURE 4, looking in the direction of the arrows thereon.

FIGURE 7 is a fragmentary and enlarged side plan view of a detail feature of the container carrying mechanism.

FIGURE 8 is another fragmentary, enlarged side plan view of another detail feature of the container carrying mechanism.

Referring to the drawings in further detail, a truck-tractor 10 is shown having a cab 12 provided at one end and an extended carrier frame 14 supported by the rear drive wheels 16. A tiltable frame 18 is provided on the carrier frame 14 and is adapted to be raised into selected tilted positions from the carrier frame by a lift mechanism including the hydraulic cylinder power actuators 20.

A truck stabilizing mechanism 22 is provided near the rear end of the truck and includes a ground engaging tail wheel 24 controlled by a power actuator 26.

The tilting frame member 18 which is carried on the truck frame 14, includes a pair of parallel spaced guide rails 28 between which is disposed a bail hook carriage 30. The carriage member 30 includes a frame 32 having guide rail engaging rollers 34 permitting the carriage member to travel the length of the tilting frame.

A bail hook 36 is mounted on the carriage 30 and has the closed end thereof biased upwardly by a leaf spring 38 which is secured as at 40 to a cross rail of the carriage 30.

The bail hook carriage 30 is reciprocal within the guide rails 28 of the tilting frame by means of dual power cylinders 42 and 44 which are engaged to a cross rail 46 of the tilting frame structure.

Suitable guide rails 28 are provided on the sides of the chassis frame 14 to receive and orient the tilting frame 18 relative thereto as received and carried on the chassis frame.

A demountable pick-up box 48 is carried on the tilting frame 18. It includes side and end walls and is structurally re-enforced by outer ribs 50 and under body re-enforcing cross rails 52. Parallel spaced support rails 54 and 56 are provided on the bottom of the pick-up box 48 and serve as skids for the box, as will be described. The support rails are disposed and spaced for engagement with the side rails of the tilting frame 18. Suitable guide flanges 58 on the tilting frame 18 align the pickup box 48 on the supporting truck frame and permit guided movement of the container box relative thereto.

A keel rail 60 is provided on the bottom of the pickup box 48 and extends substantially the full length thereof. The keel rail 60 is of heavy stock material and is formed to provide adjacently disposed forwardly and rearwardly disposed hook openings 62, 64, 66 and 68. The hook openings 62 and 66 are considered to be forwardly disposed and the hook openings 64 and 68 are considered to be rearwardly disposed.

The front end of the pick-up box 48 is formed to provide a skid-front and has the keel rail 60 extended upwardly and formed to provide a stationary hook 70.

A shuttle bar 72 is mounted on the underframe of the pick-up box 48 and in parallel adjacent relation to the keel rail 60. It is reciprocal relative to the keel rail by means of a pin and slot connection 74, 76 therebetween.

The shuttle bar 72, like the keel rail 60, is formed to include forwardly and rearwardly disposed hook openings 82, 84, 86 and 88. The hook openings 82 and 86 are considered to be forwardly disposed and the hook openings 84 and 88 are considered to be rearwardly disposed.

It will be appreciated that the spacing between the hook openings 62, 64 and 66, 68 in the keel rail 60 is less than the spacing between the hook openings 82, 84 and 86, 88 in the shuttle bar 72. The difference in spacing is equal to the travel permitted the connecting pins 74 on the keel rail within the elongated slots 76 provided in the shuttle bar so that the hook openings 62, 66 in the keel rail will be aligned with the hook openings 82, 86 in the shuttle bar when the shuttle bar is in a forwardly disposed position and the hook openings 64, 68 in the keel rail will be aligned with the hook openings 84, 88 in the shuttle bar when the shuttle bar is in its rearwardly disposed position.

The shuttle bar 72 is actuated between rearwardly and forwardly disposed positions by means of an iron bar stock hook 78 at the forwardly disposed end thereof and a depending dog 80 at the rearwardly disposed end thereof. The hook is biased (by means not shown) to an upstanding position such as shown by FIGURE 4 when the shuttle bar is in its forward position. In such position the hook 78 is complementary to the stationary hook 70 provided in the extended end of the keel bar. When the shuttle bar is moved to its rearwardly disposed position the hook assumes the position shown by FIGURE 5 where it is still accessible to the bail hook 36.

To remove the pick-up box 48 from the tilting frame 18, the bail hook carriage 30 is first actuated by the power cylinders 42 and 44 to move the shuttle bar dog or pawl 80 against the stop 90. This aligns the rearwardly disposed hook openings in the keel raid 60 and the shuttle bar 72.

It will be noted that the sled front of the pick-up box 48 includes a roller, or rollers 92. Referring to FIGURE 7, the rollers may be provided on an extension 94 of the support rails 54, 56. These extensions may in turn be disposed for engagement with stops 96 mounted on the tilting frame 18 and, in turn, lock pins 98 may be disposed through both to retain the pick-up box 48 in locked position on the tilting frame. Similarly, suitable stops 100 may be provided on the rear end of the pick-up box 48 and disposed for engagement with members 102 on the tilting frame to provide a forward limit stop.

There are essentially only four operations in the removal of the pick-up box 48 from the tilting frame structure 18.

The first operation consists of moving the bail hook carriage 30 to the rear of the tilting frame where it will engage the shuttle bar dog 80 and actuate the shuttle bar to a position aligning the rearwardly disposed hook openings in the keel rail with those in the shuttle bar.

After the shuttle bar has been positioned, the tilting frame 18 is raised and the pick-up box 48 is allowed to slide off the frame.

The bail hook carriage 30 is next retracted frm its end position until the bail hook 36 is engaged within one of the rearwardly disposed hook openings, either 64 or 68, provided in the keel rail 60.

As will be appreciated, the rearwardly disposed relative position of the shuttle bar 72, with respect to the keel rail 60, closes the forwardly disposed hook openings 62 and 66 in the keel rail by causing the forwardly disposed hook openings 82 and 86 in the shuttle bar to be misaligned therewith. At the same time, the rearwardly disposed hook openings 84 and 88 in the shuttle bar are aligned with the hook openings 64 and 68 in the keel rail. The bail hook 36, being biased against the keel rail 60, may be retracted the full length of the keel rail without positive engagement therewith since the forwardly disposed hook openings are closed and the after wall of each of the hook openings is formed to include a cam surface precluding unintentional engagement of the bail hook therein.

When the bail hook 36 snaps into engagement with one of the rearwardly disposed hook openings in the keel rail, the pressure on the bail hook carriage operating power cylinders 42 and 44 is reversed to advance the bail hook carriage and cause the bail hook to become engaged within the accessible rearwardly disposed hook openings. Further advancement of the bail hook carriage has the effect of pushing the pick-up box 48 off from the tilting frame 18.

When the bail hook carriage 30 has reached the end of its travel, it is retracted again until the bail hook 36 becomes engaged within the next open rearwardly disposed hook opening 68. It is then advanced once more and the pick-up box 48 is pushed further off from the tilting frame 18.

The pick-up box 48 is loaded on the tilting frame structure 18 of the carrier truck 10 in the following manner:

The truck 10 is backed up to the pick-up box 48 and the tilting frame 18 is raised to position the bail hook 36 for engagement with the shuttle bar actuating hook 78. The bail hook carriage 30 is then retracted causing the shuttle bar hook 78 to move the shuttle bar 72 to its forward position. This closes the rearwardly disposed hook openings 64 and 68 in the keel rail 60 and opens the forwardly disposed hook openings 62 and 66. As before, this is by alignment and misalignment between the respective forwardly and rearwardly disposed hook openings in the keel rail and shuttle bar structures.

As the bail hook carriage 30 is retracted, the bail hook 36 pulls the shuttle bar hook 78 into the position shown by FIGURE 4 and whereupon the bail hook 36 is engaged with the stationary hook 70. Further retraction of the bail hook carriage pulls the pick-up box 48 onto the tilting frame structure 18.

The bail hook carriage 30 may be fully retracted to pull the pick-up box 48 an appreciable distance up onto the tilting frame 18. However, when the pick-up box carries a heavy load, it is preferred to have the pick-up box 48 only partially disposed on the tilting frame 18 and to have the bail hook carriage 30 advanced under the pick-up box 48 to the next hook opening in order to engage the bail hook 36 therein and be able to pull the pick-up box even further up on the carrier frame.

As previously mentioned, the bail hook 36 is biased to ride along the keel rail 60 across the closed hook openings and to travel in a direction opposite to the accessible hook openings without actuating engagement with the pick-up box. Accordingly, the bail hook 36 may be carried back under the pick-up box until it snaps into engagement with the accessible bail hook opening 66.

The carriage 30 can then be retracted to securely engage the bail hook within the hook opening. Further retraction of the bail hook carriage will cause the pick-up box 48 to be pulled further onto the tilting frame 18.

In both the loading and unloading operations, it will be appreciated that the tilting frame structure 18 may be adjusted in the course of loading or unloading the pick-up box thereon. In those instances in which the pick-up box 48 is unloaded on a loading platform it may not even be necessary to operate the tilting frame 18. In such instances the bail hook carriage 30 is merely advanced and retracted in the manner mentioned to push the pick-up box off onto the loading platform or to pull the box back onto the truck.

As will be appreciated, the pick-up box 48 is pulled onto the horizontally disposed tilting frame 18 to a position where the rear hold-down stop and catch 100, 102 are engaged. At such time the skid extensions 94 abut the stops 96 and enable the lock pins 92 to be used. Although it is not necessary, the bail hook 36 may be kept in engagement with the hook opening 62 to further secure the pick-up box on the carrier frame. In such position the hook is near the shuttle bar actuating dog 80 and very little travel of the bail hook carriage 30 is required when the next unloading operation is to take place.

From the foregoing description it will be appreciated that a positive means of loading and unloading a demountable truck body, or container, onto a vehicle carrier frame is provided by the operating mechanism disclosed. Whether the pick-up box is being loaded or unloaded from the carrier vehicle, it is at all times securely held until a stable position is obtained.

Although a preferred embodiment of this invention has been shown and disclosed, it will be appreciated that certain modifications and improvements are within the spirit and scope of the teachings set forth. Such of these improvements as are not expressly excluded by the hereinafter appended claims are to be considered as included thereunder.

We claim:

1. A demountable truck body, comprising: a load carrying container receivable on the carrier frame of a highway vehicle, container loading and unloading means provided on said highway vehicle carrier frame, said container including a plurality of forwardly and rearwardly disposed and downwardly open hooks provided on the underside thereof and adapted for engagement by said container loading and unloading means, and means disposed in operative relation next adjacent said hooks and interconnected for simultaneously closing and holding closed said forwardly disposed hooks in the course of loading said container on a highway vehicle carrier frame and alternately closing and holding closed said rearwardly disposed hooks in the course of unloading said container therefrom.

2. A demountable truck body, as provided by claim 1, and having said last mentioned means mounted on the underside of said container next adjacent said hooks and extending between the furthest separated thereof.

3. The demountable truck body of claim 1, having said last mentioned means disposed for actuation by said container loading and unloading means.

4. A demountable truck body, comprising: a load carrying container receivable on the carrier frame of a highway vehicle, a center keel rail provided on the underside of said container member and extending substantially the length thereof, a plurality of downwardly open and oppositely disposed pairs of hook openings provided in said keel rail, container loading and unloading means including a bail hook operator engageable within said hook openings, a shuttle bar provided next adjacent said keel rail and reciprocal fore and aft relative thereto, said shuttle bar having hook openings complementary to said keel rail hook openings and disposed for alternate alignment with respectively oppositely disposed thereof in opposite disposed positions of said shuttle bar, and means provided on said shuttle bar for actuation thereof.

5. The demountable truck body of claim 4 comprising: an extended hook member provided on one end of said shuttle bar and operative of said shuttle bar in one direction, and a depending pawl provided at the other end of said shuttle bar for actuation thereof in the other direction.

6. A demountable truck body receptive on the load carrying frame of a highway vehicle and comprising: a freight carrying box member having parallel spaced skids provided on the underside and extending the length thereof, a keel rail provided on the underside of said container in parallel spaced relation between said skids and extending substantially the length thereof, a shuttle bar mounted next adjacent said keel rail and reciprocal fore and aft relative thereto, forwardly and rearwardly disposed downwardly open hook openings provided in said keel rail and said shuttle bar, means provided on said shuttle bar at opposite ends thereof for reciprocal actuation thereof, said forwardly disposed hook openings in said keel rail and shuttle bar being disposed for alignment and said rearwardly disposed openings being disposed for misalignment in the forwardly disposed relative position of said shuttle bar, said rearwardly disposed hook openings in said keel rail and shuttle bar being disposed for alignment in the rearwardly disposed disposition of said shuttle bar and said forwardly disposed openings being then misaligned and accordingly closed, and operative means providable on said highway vehicle carrier frame and reciprocal substantially the length thereof for engagement with aligned of said hook openings and corresponding loading and unloading engagement with said container member.

References Cited in the file of this patent

Circular by Dempster Brothers, Inc., Folder No. 6590, copyrighted 1959—six pages.